United States Patent [19]

St. Clair et al.

[11] 4,398,021

[45] Aug. 9, 1983

[54] SOLVENT RESISTANT, THERMOPLASTIC AROMATIC POLY(IMIDESULFONE) AND PROCESS FOR PREPARING SAME

[75] Inventors: Terry L. St. Clair, Poquoson, Va.; David A. Yamaki, Deptford, N.J.

[73] Assignee: The United States of America as represented by the Administrator of the National Aeronautics and Space Administration, Washington, D.C.

[21] Appl. No.: 407,240

[22] Filed: Aug. 11, 1982

[51] Int. Cl.$^3$ .............................................. C08G 73/10
[52] U.S. Cl. .................................... 528/222; 264/137; 264/258; 264/331.12; 264/331.46; 528/226
[58] Field of Search ........................ 528/226, 222, 353

[56] References Cited

U.S. PATENT DOCUMENTS

| | | | |
|---|---|---|---|
| 3,440,202 | 4/1969 | Boldebuck et al. | 528/226 |
| 3,506,583 | 4/1970 | Boram et al. | 528/226 |
| 3,700,649 | 10/1972 | Boram et al. | 528/226 |
| 3,793,281 | 2/1974 | Acle, Jr. | 528/226 |
| 4,094,862 | 6/1978 | Bell | 528/226 |

*Primary Examiner*—Lester L. Lee
*Attorney, Agent, or Firm*—Howard J. Osborn; John R. Manning; Wallace J. Nelson

[57] ABSTRACT

A process for preparing a thermoplastic poly(imidesulfone) is disclosed. This resulting material has thermoplastic properties which are generally associated with polysulfones but not polyimides, and solvent resistance which is generally associated with polyimides but not polysulfones. This system is processable in the 250°–350° C. range for molding, adhesive and laminating applications. This unique thermoplastic poly(imidesulfone) is obtained by incorporating an aromatic sulfone moiety into the backbone of an aromatic linear polyimide by dissolving a quantity of a 3,3',4,4'-benzophenonetetracarboxylic dianhydride (BTDA) in a solution of 3,3'-diaminodiphenylsulfone and bis(2-methoxyethyl)ether, precipitating the reactant product in water, filtering and drying the recovered poly(amide-acid sulfone) and converting it to the poly(imidesulfone) by heating.

5 Claims, No Drawings

SOLVENT RESISTANT, THERMOPLASTIC AROMATIC POLY(IMIDESULFONE) AND PROCESS FOR PREPARING SAME

ORIGIN OF THE INVENTION

The invention described herein was jointly made by a present and a former employee of the U.S. Government and may be used by or for the Government for governmental purposes without the payment of any royalties thereon or therefor.

BACKGROUND OF THE INVENTION

Aromatic polysulfones are a known class of polymers which are thermoplastically processable. These materials have a major drawback in their tendency to be soluble in several solvents such as chloroform, methylene chloride, cyclohexanone, cresol, and hydraulic fluids. This solubility causes components which are fabricated from these polysulfones to be susceptible to damage by these solvents, and therefore, precludes use of this polymer system for many applications.

Aromatic polyimides, conversely, are a class of polymers which are generally considered not to be readily processable via thermoplastic techniques, but exhibit exceptional resistance to solvents.

Both the aromatic polysulfones and aromatic polyimides have good thermal stabilities with the use temperatures thereof being generally governed by the softening temperature of each system.

There is thus a definite need in the art for a solvent resistant polysulfone and a thermoplastic polyimide which can be used as a molding compound, as an adhesive, and as a resin for the fabrication of fiber reinforced composites.

Accordingly, an object of the present invention is to provide a solvent resistant aromatic polysulfone.

Another object of this invention is to produce a thermoplastic aromatic polyimide.

Another object of this invention is to make a thermoplastic, solvent resistant polymer which can be utilized as a molding resin.

Another object of this invention is the production of a thermoplastic, solvent resistant polymer which can be utilized as an adhesive.

Another object of this invention is to provide a thermoplastic, solvent resistant polymer which can be utilized as a matrix resin for fiber reinforced composites.

Another object of the present invention is a process for thermoplastically forming moldings, adhesive bonds and fiber reinforced composites from solvent resistant aromatic polysulfones.

An additional object of the present invention is a process for combining two high temperature polymer systems to retain the advantageous properties of each while minimizing or eliminating the disadvantages thereof.

BRIEF SUMMARY OF THE INVENTION

According to the present invention, the foregoing and other objects are attained through the incorporation of an aromatic sulfone moiety in the backbone of an aromatic, linear polyimide to yield an aromatic poly(imidesulfone) prepared in bis(2-methoxyethyl)ether solvent. This polymer system results in a thermoplastic material with improved processability over the base polyimide system. Conversely, the incorporation of an imide segment into the base polysulfone system results in a solvent resistant polymer which was previously soluble in common solvents.

This poly(imidesulfone) can be thermoplastically processed in the 250°–350° C. range in such a manner as to yield high quality, tough moldings; strong, high temperature resistant, adhesive bonds; and well formed, structural composites.

DETAILED DESCRIPTION OF THE INVENTION

The basic structure of the polymer system is:

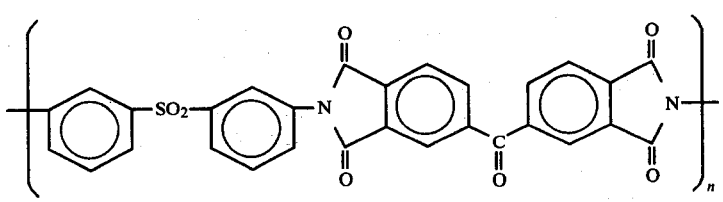

where n is an integer and represents up to several hundred repeat units.

In the above structure, it is concluded that the 3,3'-diphenylsulfone segment of the polymer chain causes the polymer to be thermoplastic. This conclusion is based on the experimetal results obtained by use of the following segments, when substituted for the diphenylsulfone in the basic structure, resulted in polyimides that were not thermoplastic:

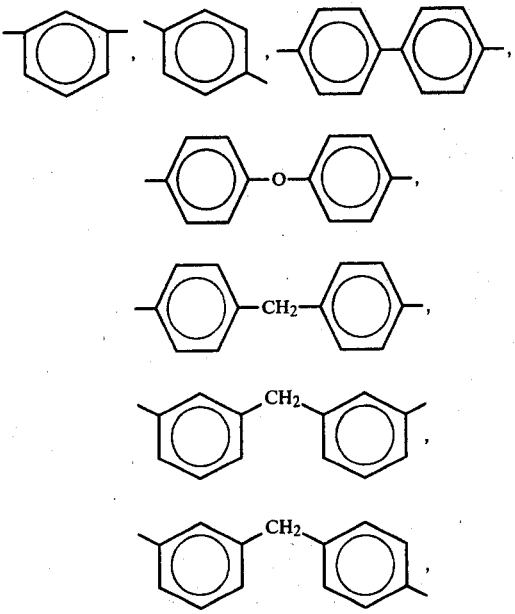

-continued

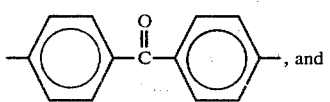, and

The following groupings did impart some degree of thermoplastic nature to the base polymer, but lacked the thermoplastic completeness obtained by the 3,3'-diphenylsulfone:

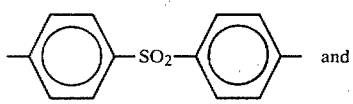

Both exemplary polymers prepared with these moieties had only limited flow in the 250°–350° C. range when compared to the 3,3'-diphenylsulfone containing polyimide of the present invention.

The improvement in solvent resistance for the poly(imidesulfone) of the present invention was proven by comparing it to the polysulfone of the following structure:

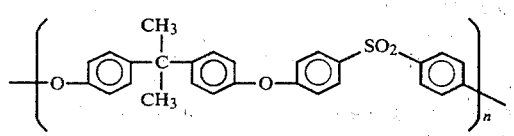

where n is an integer and represents several hundred repeat units.

This polymer was found to swell, and subsequently dissolve when a film prepared therefrom was placed in cresol, chloroform, cyclohexanone, methylenechloride, 1,1,2,2-tetrachloroethane, and aircraft hydraulic fluid which contains tricresylphosphate. By contrast, when thin films of the poly(imidesulfone) of the present invention were placed in these solvents, they were not affected. After removal from the solvents, films prepared by the present invention had the same softening temperature as before exposure. Even slight solvation of the polymer would be expected to cause a considerable lowering of the softening temperature.

Adhesive lap shear samples prepared with the poly(imidesulfone) of the present invention has exceptionally high strengths when tested at ambient temperature, 177° C. and 232° C. both before and after aging for 1000 hours at 232° C. in a flowing air oven (See TABLE I below).

TABLE I

| Adhesive Properties of Poly(imidesulfone) | |
|---|---|
| Test Temperature & Exposure | Lap Shear Strength*, psi |
| 25° C. initial | 4200 |

TABLE I-continued

| Adhesive Properties of Poly(imidesulfone) | |
|---|---|
| Test Temperature & Exposure | Lap Shear Strength*, psi |
| 177° C. initial | 3200 |
| 232° C. initial | 2600 |
| 25° C. after 1000 hr @ 232° C. | 3500 |
| 177° C. after 1000 hr @ 232° C. | 3200 |
| 232° C. after 1000 hr @ 232° C. | 2900 |

*Titanium Adherends

Also, unfilled moldings prepared from the poly(imidesulfone) of the present invention were clear and had properties that are reasonable for a linear thermoplastic. This data is listed in TABLE II.

TABLE II

| Properties of Unfilled Poly(imidesulfone) Moldings | |
|---|---|
| Property | |
| Tensile strength, ksi | 9.2 |
| Strain to failure, in/in | 0.015 |
| Modulus, ksi | 700 |
| Poisson's ratio | 0.37 |
| $G_{Ic}$, Joules/meter$^2$ | 1400 |
| Glass Transition Temperature, °C. | 239 |

Graphite fiber reinforced moldings (composites) were prepared using unidirectional high tensile strength fibers in the resin. Physical data on these samples are presented in TABLE III.

TABLE III

| Unidirectional Graphite Fiber Reinforced Composites of Poly(imidesulfone) | |
|---|---|
| Thickness, cm | 0.25 |
| Interlaminar Shear Strength, psi | |
| Test Temp | |
| RT | 11,500 |
| 121° C. | 7,000 |
| 177° C. | 6,900 |
| Softening Temperature, °C. | 205 |
| Resin Content, % | 33 |
| Density, g/cc | 1.5 |

SPECIFIC EXAMPLES

Example I

Preparation of the poly(amide-acid sulfone) of 3,3'4,4'-benzophenonetetracarboxylic dianhydride and 3,3'-diaminodiphenylsulfone 25.8 g (0.08 moles) of 3,3',4,4'-benzophenonetetracarboxylic dianhydride (BTDA) was added to a solution of 19.9 g (0.08 moles) of 3,3'-diaminodiphenylsulfone (3,3'-DDS) in 258.6 g (1.9 moles) of bis(2-methoxyethyl)ether. This mixture was allowed to rapidly stir until all of the BTDA had dissolved. Slower stirring was continued for an additional two hours in order to allow molecular weight to build. At this stage, the polymer in solution is a poly(amide-acid)sulfone.

Example II

Precipitation and isolation of the Poly(amide-acid Sulfone)

The viscous polymer solution from Example I was poured into a mechanical blender containing water. The contact with water caused the poly(amide-acid sulfone) to precipitate and the blender blades chopped this material to fluffy consistency. The solid polymer was isolated by suction filtration and was allowed to dry overnight.

Example III

Conversion of the Poly(amide-acid)Sulfone to the Poly(imidesulfone)

The dried polymer from Example II was poured into a container which was placed in a forced air oven and subsequently heated to 100° C. The polymer was held at this temperature for one hour to drive off residual water and solvent. The temperature was then increased to 200° C. to effect conversion of the amide-acid portions of the polymer to the imide.

Example IV

Preparation of Unfilled Molding of the Poly(imidesulfone)

The polymer from Example III was placed in an open mold in a hydraulic press equipped with heated platens. The open mold containing the polymer was heated to 220° C. and held at that temperature for 15 minutes. A plunger was next placed in the cavity of the mold and pressure was applied on the polymer. The pressure was increased over a five minute period to 300 pounds per square inch. The temperature of the mold containing the polymer was next increased to 280° C. at a rate of 5° C. per minute. Pressure was maintained on the polymer at this temperature for 30 minutes. The mold was allowed to cool to approximately 100° C. before pressure was released. The mold was opened and the molded part was removed.

Example V

Preparation of Adhesive Bonds with Poly(imidesulfone)

Duplicate one inch wide strips of 0.050 inch thick titanium alloy were grit blasted with 120 mesh aluminum oxide and subsequently coated with the poly(amide-acid sulfone) from Example I. Several layers were built up with thermal treatments between layers. The thermal treatment included 15 minutes at 100° C. and 15 minutes at 200° C. to remove solvent and convert the amide-acid to the imide, respectively. These strips were next overlapped so that the adhesive layers met. A thin (0.004 inch) piece of woven glass cloth was inserted between the strips to control the bond-line thickness. Pressure was applied (200 pounds per square inch) and the sample was heated at 5° C. per minute to 300° C. The system was cooled and the bonded specimen was removed.

Example VI

Preparation of Fiber Reinforced Moldings

The polymer solution from Example I was used to coat graphite fiber at a 40 percent by weight dried resin to 60 percent by weight fiber mix. The 40/60 ratio of resin to fiber mix is precalculated to yield the 40 percent by weight resin content after removal of the solvent by evaporation. In the specific Examples described herein, the graphite fiber employed was Celion 3000, having a diameter of $7 \times 10^{-6}$ M and a product of the Celanese Corporation. After the solvent had evaporated (exposure to 35°–40° C. for 12 hours), the coated fiber was cut into pieces 3 inches by 6 inches. These pieces were placed in an oven and heated for 30 minutes at 100° C. and subsequently 30 minutes at 220° C. This thermal treatment was done to remove solvent and convert amide-acid to imide. Twelve individual dried and imidized pieces were stacked in a mold cavity and a top inserted. The closed mold was placed in a hydraulic press equipped with platens for heating. Pressure was applied (400 psi) and the temperature was raised to 280° C. and held under these conditions for one hour. The system was cooled to approximately 100° C. and the mold was opened and the graphite fiber reinforced molding was removed.

It is thus seen that the foregoing specific Examples are illustrative of a novel poly(imidesulfone) system having improved thermoplastic and solvent resistant property characteristics and the process for preparing same, and useful as molding resins, adhesives and in the preparation of fiber reinforced composites.

The specific Examples described herein are to merely illustrate the invention and are not to be deemed as exhaustive. Thus, various modifications and variations of the present invention will be apparent to those skilled in the art without departing from the spirit and scope of the appended claims.

What is claimed as new and desired to be secured by Letters Patent of the United States is:

1. A process for preparing thermoplastic poly(imidesulfone) comprising:
   incorporating an aromatic sulfone moiety into the backbone of an aromatic linear polyimide by dissolving a quantity of a 3,3'4,4'-benzophenonetetracarboxylic dianhydride (BTDA) in a solution of 3,3'-diaminodiphenylsulfone and bis(2-methoxyethyl)ether, precipitating the reactant product in water, filtering and drying the recovered poly(amide-acid sulfone) and converting it to the poly(imidesulfone) by heating.

2. The process of claim 1 wherein the imide conversion step involves heating for approximately one hour at 100° C. to drive off residual water and solvent and thereafter increasing to and maintaining a temperature of approximately 200° C. for at least fifteen minutes to effect imidization.

3. The process of claim 1 wherein the BTDA-3,3'-diaminodiphenylsulfone and bis(2-methoxyethyl)ether solution is stirred for at least two hours prior to precipitating the reactant product in water.

4. The process of claim 3 wherein the precipitation step is performed in a mechanical blender and the blender used to chop the precipitate into a fluffy consistency solid polymer.

5. The process of claim 4 wherein the fluffy consistency solid polymer is isolated by suction filtration, and dried overnight at room temperature prior to the heat conversion treatment.

* * * * *